Oct. 13, 1959 N. P. DI GIOVANNI 2,908,183
ACCELERATOR FOOT CONTROL AND ADJUSTMENT MECHANISMS
Filed April 21, 1953 5 Sheets-Sheet 1
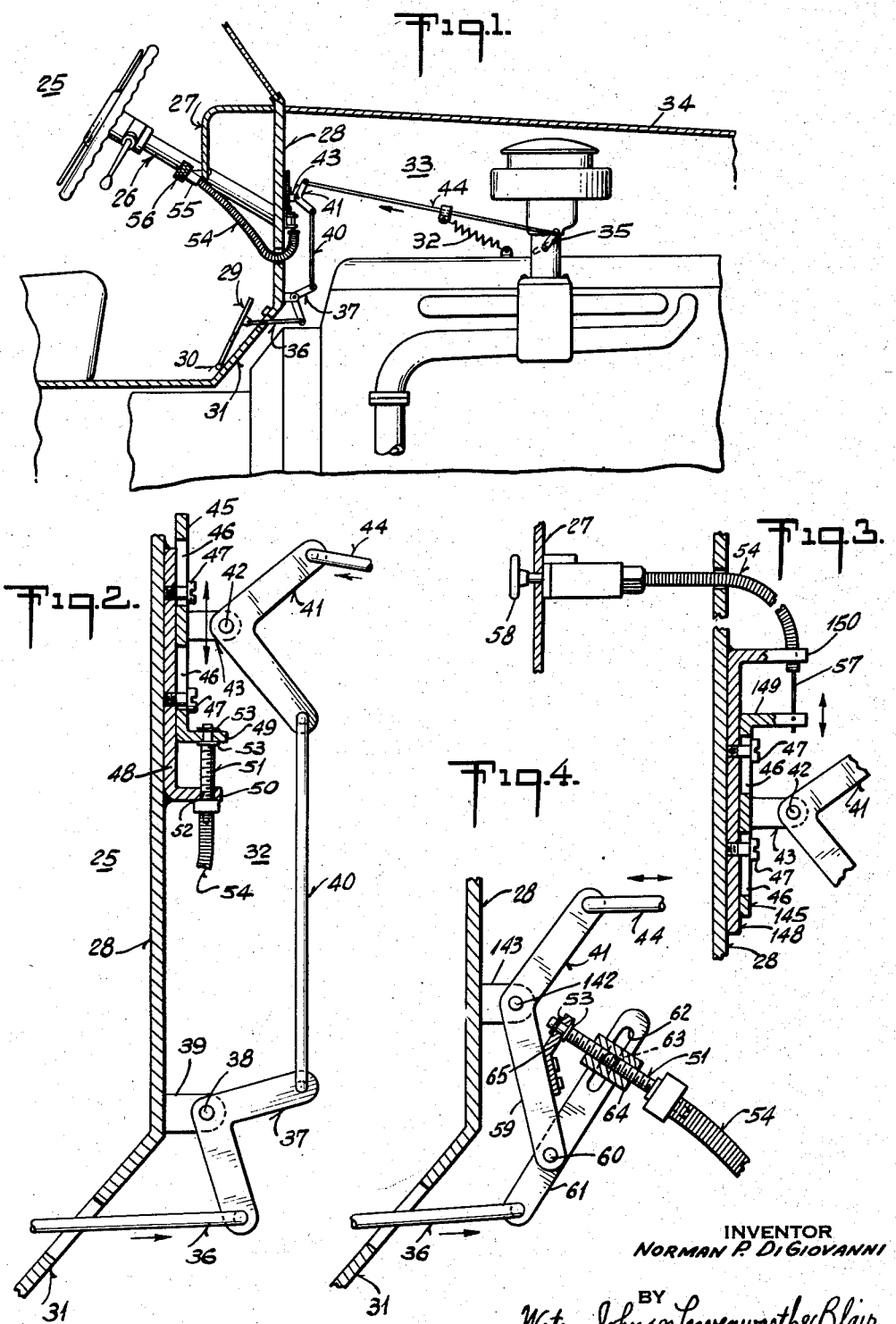
INVENTOR
NORMAN P. DI GIOVANNI
BY
Watson Johnson Leavenworth & Blair
ATTORNEYS

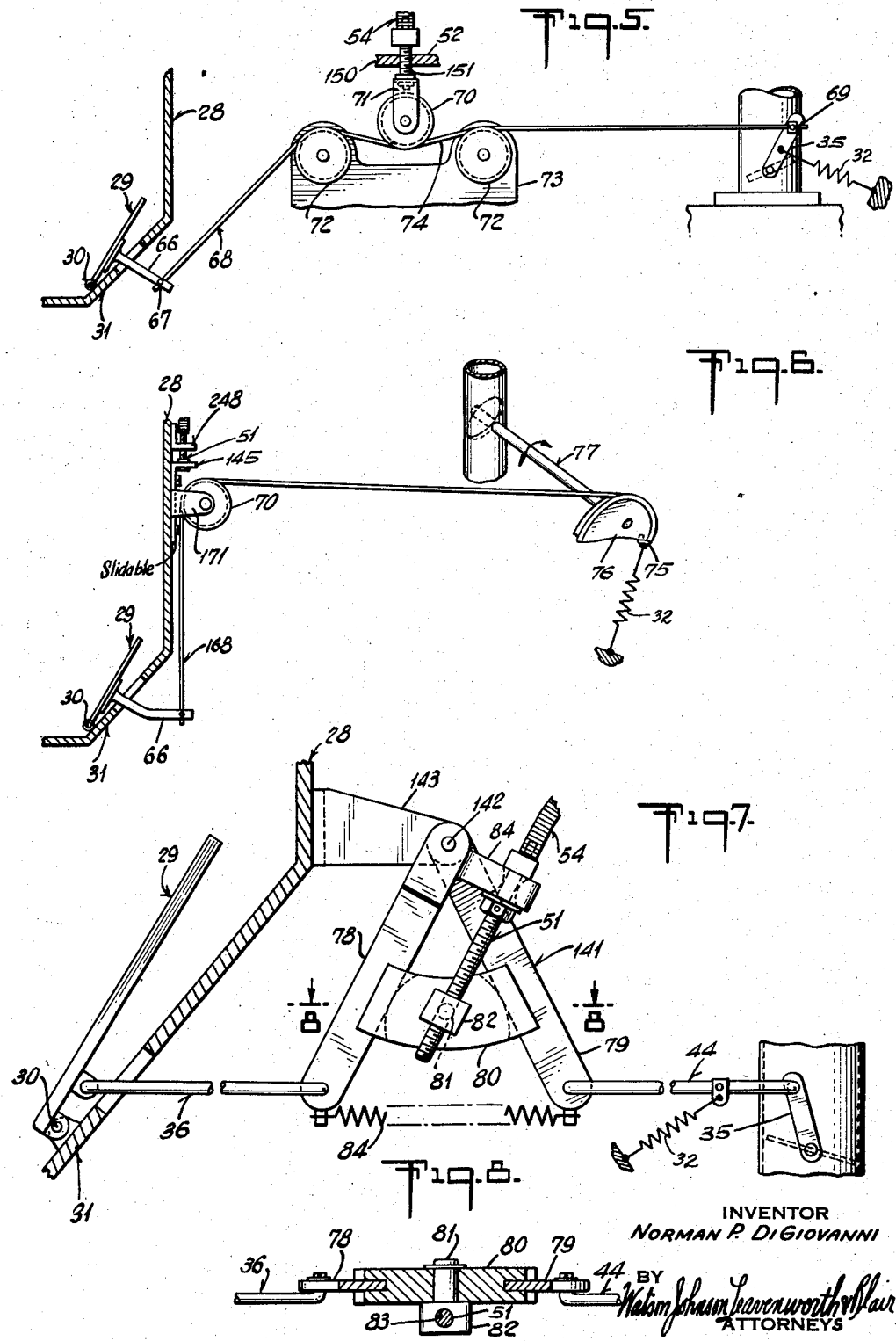

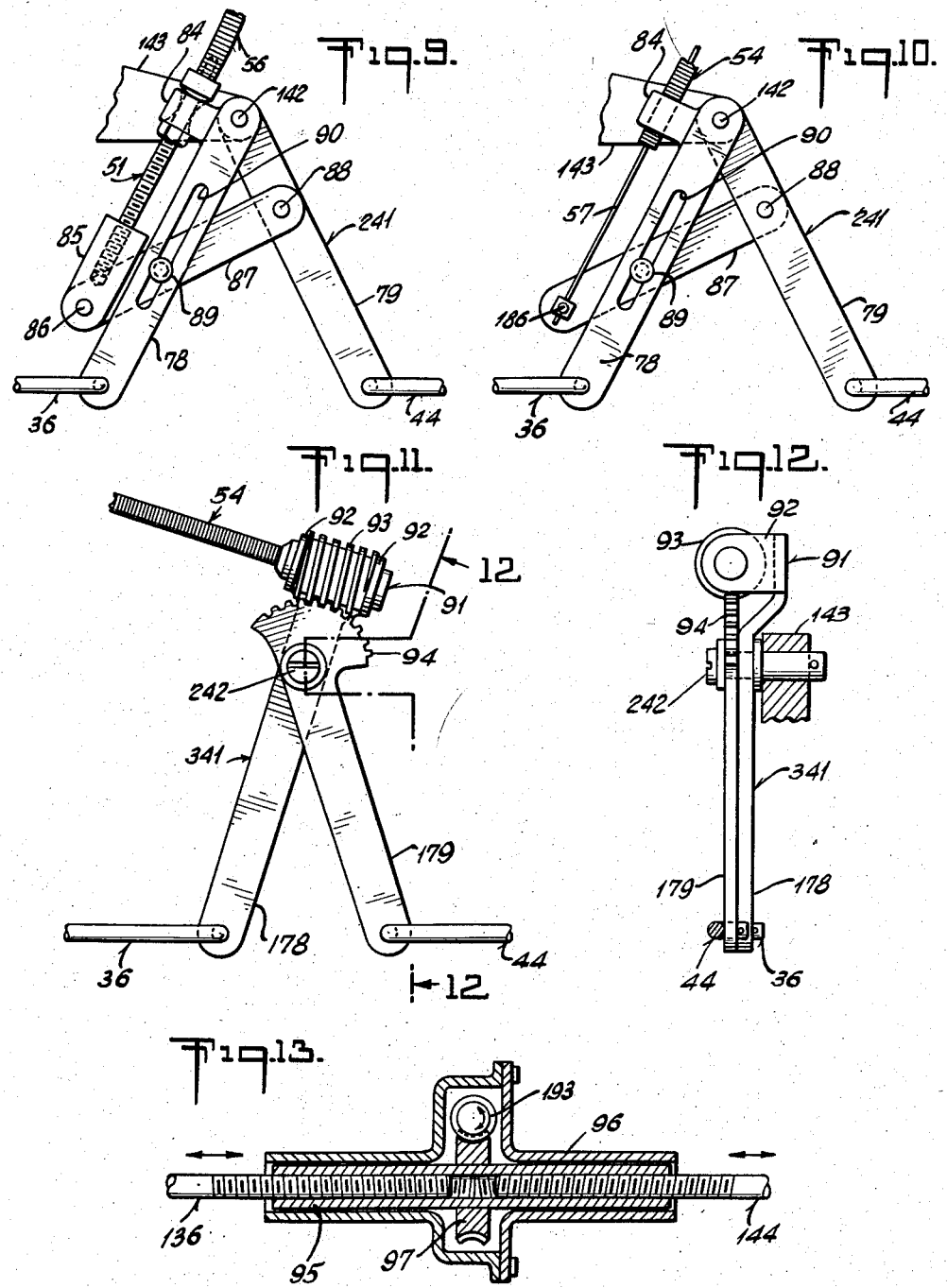

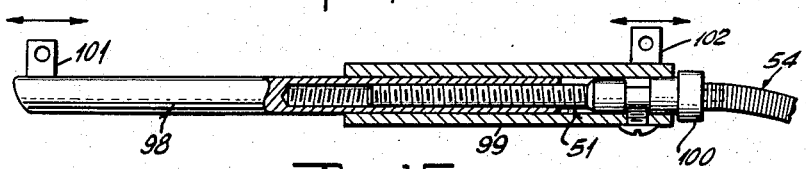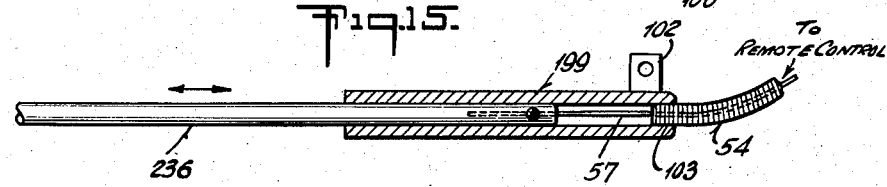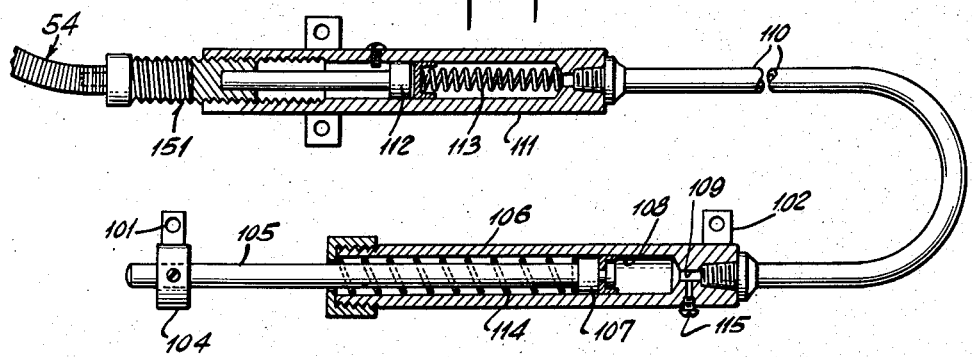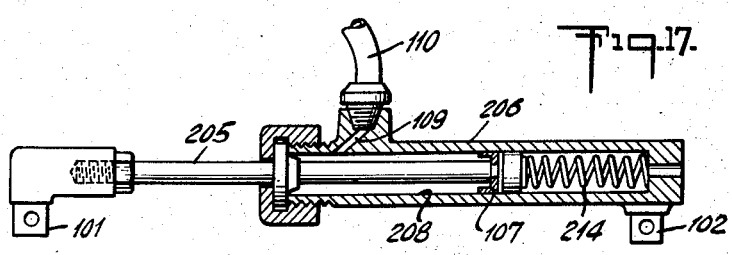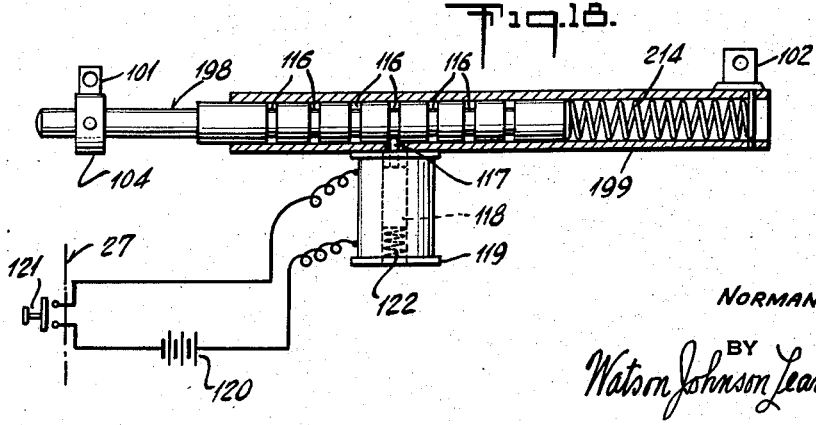

Oct. 13, 1959     N. P. DI GIOVANNI     2,908,183
ACCELERATOR FOOT CONTROL AND ADJUSTMENT MECHANISMS
Filed April 21, 1953     5 Sheets-Sheet 5
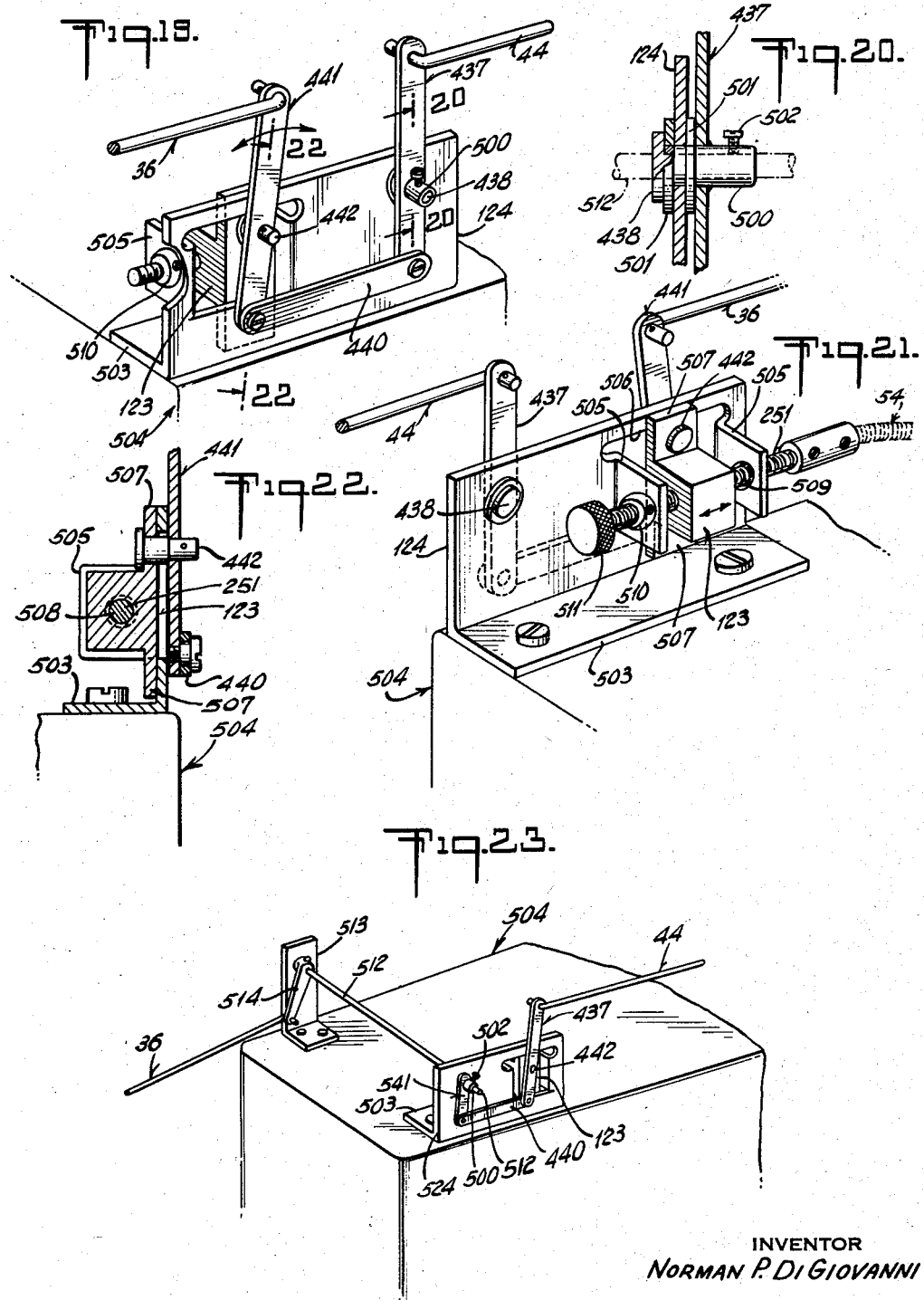
INVENTOR
NORMAN P. DI GIOVANNI
BY
Watson Johnson Leavenworth & Blair
ATTORNEYS

United States Patent Office 2,908,183
Patented Oct. 13, 1959

2,908,183

ACCELERATOR FOOT CONTROL AND ADJUSTMENT MECHANISMS

Norman P. Di Giovanni, Babylon, N.Y.

Application April 21, 1953, Serial No. 349,995

19 Claims. (Cl. 74—513)

The present invention relates to means for adjusting the relative still positions of the accelerator foot controls or pedals of automobiles, and the like, without affecting the settings of control or throttle valves to which they are connected.

A general object of the present invention is to provide such mechanisms which are readily constructed on an economical commercial basis and easily incorporated or installed with little skill being required, the mechanisms comprising means to alter the effective lengths of the linkages between the foot controls or pedals and valves and being effectively operable by remote controls.

A more specific object of the present invention is to provide such mechanism whereby the effective length of the throttle valve operating linkage is alterable at will from a remote control readily accessible to the operator or automobile driver from his normal operating or driving position, as in the driver's compartment, whereby he may quickly and easily adjust the still position of the accelerator foot control or pedal to that most convenient and comfortable to his physical characteristics. The "still" position of such foot control or pedal is that stationary position temporarily assumed by the foot control when the throttle valve is held biased to its engine-idling setting and without an operator's foot resting upon or depressive force being applied to said foot control.

Another object of the present invention is to permit simple and rapid adjustment of the position of the accelerator foot control by a driver from a hand control readily accessible to him or her as he or she sits behind the automobile wheel; whereby the varying demands of tall and short stature, legs of different lengths, and the wearing of different styles of shoes having heels of widely different types and heights are readily accommodated to the attainment of the most comfort in driving.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

Fig. 1 is an elevational view, with parts broken away and in section, of a part of a diagrammatic showing of a portion of an automobile, illustrating mount therein of an embodiment of the present invention;

Fig. 2 is an enlarged side elevational view, with parts broken away and in section, of the structure in the vicinity of means for altering the effective length of the linkage between the accelerator foot control or pedal and the throttle valve illustrated in Fig. 1;

Fig. 3 is a side elevational view, with parts broken away and in section, of a slightly modified form of the embodiment shown in Figs. 1 and 2;

Fig. 4 is an elevational view, similar to Figs. 2 and 3, of an additional embodiment of the present invention;

Fig. 5 is a side elevational view, with parts broken away and in section, showing a modified form of the invention as embodied in the linkage between the throttle valve and the accelerator pedal;

Fig. 6 is a view similar to Fig. 5 of a still further modification of the present invention;

Fig. 7 is an enlarged side elevational view, with parts in section and broken away, illustrating a further modification of the present invention as embodied in the linkage connecting the shown accelerator to the illustrated throttle valve;

Fig. 8 is a sectional view taken substantially on line 8—8 of Fig. 7;

Fig. 9 is a side elevational view, with parts broken away, showing a modified form of the section of the linkage illustrated in Fig. 7 for varying the effective length thereof;

Fig. 10 is a view similar to Fig. 9 of a further modified form;

Fig. 11 is a view similar to Figs. 9 and 10 of still another modification;

Fig. 12 is a sectional view taken substantially on line 12—12 of Fig. 11, and showing certain of the structure in end elevation;

Fig. 13 is an axial section of another modification of the adjustable section of the throttle valve control linkage;

Fig. 14 is a side elevational view, with parts broken away and in section, of a modified form of the type of adjustable linkage section illustrated in Fig. 13;

Fig. 15 is an axial section of still another modification of the type of structure shown in Figs. 13 and 14;

Fig. 16 is a side elevational view, with parts broken away and in axial section, of a fluid pressure modification of the type of adjustable sections illustrated in Figs. 13, 14 and 15, and illustrating part of control means for operating the same;

Fig. 17 is a view similar to Fig. 16 of a still further modification, but with the control means of Fig. 16 omitted, since the latter may be used therewith;

Fig. 18 is an axial section of an electrically-operated modification of the adjustable linkage section device shown in Figs. 13 to 17 inclusive;

Fig. 19 is an elevational perspective, with parts broken away, of still another embodiment of the present invention, and illustrating means for varying the effective length of the linkage connecting the accelerator pedal to the throttle valve;

Fig. 20 is a sectional detail taken substantially on line 20—20 of Fig. 19;

Fig. 21 is another side elevational perspective of the structure shown in Fig. 19 and illustrating the structure thereof as viewed from the opposite side;

Fig. 22 is a sectional view taken substantially on line 22—22 of Fig. 19; and

Fig. 23 is an elevational perspective similar to Fig. 19, illustrating a modified form of the embodiment shown in Figs. 19 to 22 inclusive.

Prior to the present invention, many attempts have been made to improve the conditions in the driver's compartment of an automobile, and the like, to increase his comfort. Such efforts have included means for adjusting the position and elevation of the seat, leg and knee rest devices, and the structure of the fuel control treadle or accelerator pedal. Variations in people's stature, length of limbs, and sizes and dimensions of shoes as well as the heights of the heels thereof, have suggested that the position and orientation of the engageable face of the accelerator treadle could be altered to comfort advantage of drivers differing in those characteristics. For example, a lady driver wearing high-heeled pumps should find a certain elevation and/or angular position of the accelerator pedal much more comfortable than some other elevation and/or position which may be most comfortable to a man. The present invention effectively overcomes these problems of the prior art by making the linkage between the accelerator foot control or pedal and the throttle valve readily adjustable in effective length from a point readily accessible to the driver as he sits in the driving compartment in normal driving position. Such variations in the effective length of the linkage alter the elevation and/or angular position of the accelerator foot control or pedal without affecting the throttle valve setting, as will appear more fully hereinafter.

Referring to the drawings, wherein like numerals identify similar parts throughout, it will be seen from Figs. 1 and 2 that an embodiment of the present invention may be employed to advantage in an automobile, parts of which are shown diagrammatically in Fig. 1. As therein indicated, the car may be provided with the usual driver's compartment 25, having the usual steering equipment 26, mounted in front of the dash or instrument board 27, rearwardly of the usual bulkhead or fire wall 28. The usual accelerator foot control, illustrated as a pedal 29, is pivotally mounted at 30 in the usual manner to the floor board 31 in the driver's compartment 25 and may, if desired, be biased outwardly by any suitable means such as a spring, connected to the throttle valve linkage as diagrammatically illustrated at 32. The accelerator pedal 29 is connected by suitable linkage means which suitably extends through into the engine compartment 33 beneath the hood 34, there to be connected to the operating arm 35 of the usual throttle valve. Preferably the means biasing the foot control to an outward position is mounted between the throttle valve and the linkage adjusting mechanism of the present invention, as proposed in Fig. 1, and the showing therein is employed chiefly by way of illustration. Further, the present means may be used to advantage to adjust the elevation of an accelerator foot control when of another common type, such as a spring-biased button.

In accordance with the teachings of the present invention, the embodiment illustrated in Figs. 1 and 2 may comprise a link 36 extending through a hole in the floor board 31 to be pivotally connected to the accelerator pedal shown in Fig. 1 and, in turn, pivotally connected to one end of a lever 37 of the first class, preferably in the form of a bell crank. Bell crank 37 may be pivotally mounted at 38 to bracket 39 on the bulkhead 28. The other end of bell crank 37 may be connected by a link 40 to one end of a second lever 41 of the first class, also preferably in the form of a bell crank. Bell crank 41 is pivotally mounted at 42 to a movable bracket 43 and the other end of the lever may be connected by a link 44 to the throttle valve arm 35.

As will be best understood from Fig. 2, the movable bracket 43 for changing the location of the pivot point of the lever arm 41 may be mounted upon a slidable plate 45. Plate 45 preferably has a pair of slots 46, 46 therein, each of which slidably receives the shank of a headed bolt 47, suitably fixed to the bulkhead 28, such as by being anchored in a base plate 48, which may be bolted or welded to the bulkhead. Preferably, the slidable plate 45 carries a flange 49 extending substantially normal thereto and opposed in spaced-apart relation to another normally-extending flange 50 on base plate 48. The movable plate 45 is to be moved relative to the fixed base plate 48 from a remote point readily accessible to the driver when he is in the normal driving position in the driver's compartment 25. Accordingly, an advancing screw 51 may be threadably received through an internally threaded hole 52 in base plate flange 50 and rotatably connected to the movable plate or bracket flange 49, such as by means of a pair of abutment collars 53, 53 fixed to the screw and located on opposite sides of the latter flange. This may be reversed with the threaded engagement of screw 51 in an internally threaded hole in flange 49, while being rotatably anchored in flange 50. Thus, when screw 51 is rotated in one direction it causes the flanges 49 and 50 to approach each other and when rotated in the opposite direction it causes them to move away from each other. The adjusting screw 51 is suitably connected for rotation to a flexible shaft housed within flexible tubing or conduit 54, which may extend through a hole in the bulkhead 28 to be supported by any suitable bracket 55 upon the dash or instrument board 27, with the flexible shaft there provided with a manual hand knob 56 readily accessible to the driver.

The driver may use the embodiment of the device shown in Figs. 1 and 2 to advantage after he has, by trial, determined that the elevation and/or still angular position of the accelerator pedal 29 may be more suited to his comfort if changed. The driver may effect such change in the still position of the accelerator pedal 29 without affecting in any way the engine idling speed setting or the position of the throttle valve. If the driver rotates the remote hand control knob 56 to cause its flexible shaft to retract the screw 51 relative to the flange 50, the pivot point 42 of the upper bell crank 41 will be moved downwardly with its supporting bracket 43 and slidable plate 45. As a result, bell crank 37 will be swung clock-wise so that link 36 will move to the left as viewed in Figs. 1 and 2 to permit the accelerator pedal to swing out away from the floor board 31. Rotation of the hand control knob 56 in the opposite direction, of course, will advance the screw 51 from such retracted position to move the pivot point 42 upwardly so as to reverse the motion of the parts, thereby causing the accelerator pedal 29 to be swung toward the floor board 31 against spring biasing. There will be less resistance to the hand adjustment of the linkage adjusting mechanism if the spring-biasing is applied to the linkage between the throttle valve and this mechanism.

As proposed in Fig. 3, such movement of the pivot point 42 may be effected by a flexible cable or pull wire 57, having one end anchored to flange 149 of slidable plate 145, movably mounted relative to fixed base plate 148 in a manner similar to that described above. The flange 150 on fixed base plate 148 may serve to anchor one end of the flexible tube housing 54 through which the pull wire 57 may slide and with the latter provided with a pull and push hand knob 58 on the face of the dash board 27. Pull on the hand knob 58 causes the pivot point 42 to raise so as to swing the accelerator pedal toward the floor board, and push on that control hand knob from such extended position will cause the pivot point to be moved down to swing the accelerator pedal away from the floor board.

As shown in Fig. 4, bell crank 41 may be pivotally mounted at a fixed pivot point 142 to a bracket 143, fixed to the bulkhead 28. One arm 59 of bell crank 41 may be pivotally connected at 60 to a lever arm 61 having one end connected to link 36 and the other end slotted at 62, slidably to receive a headed pivot pin 63 carried on one side of an internally threaded sleeve 64. A bracket 65, mounted on bell crank arm 59, may have rotatably connected thereto adjusting screw 51, which is threadably received through the pivoted sleeve 64. The adjusting screw 51 is to be rotated by a flexible shaft housed in flexible conduit 54, as in the embodiment of Figs. 1 and 2, and to be operated by a hand knob such as that proposed at 56.

In the Fig. 4 embodiment, when the screw 51 is retracted or backed out of pivoted sleeve 64, lever arm 61 is swung counter clockwise as there viewed. As a result, the link 36 is pulled inwardly to cause the accelerator pedal to be swung toward the floor board 31. When the adjusting screw 51 is rotated in the opposite direction, it will swing the lever arm 61 reversely in the clockwise direction so as to push the link 36 outwardly to swing the accelerator pedal away from the floor board.

In the embodiment illustrated in Fig. 5, the accelerator pedal 29 may carry a fixed arm 66, extending through a hole in the floor board 31, and to which may be connected at 67 one end of a flexible cable 68 having its other end connected at 69 to the throttle valve operating arm 35, to serve as the connecting linkage. The flexible cable 68 may be lapped against or trained over suitable movable guide means so as to alter the effective length thereof. Such movable guide means may comprise a sheave or pulley 70, pivotally supported by a bifurcated member or fork 71 rotatably supported upon an adjusting screw 151. The adjusting screw 151 may be threadably mounted through an internally threaded hole 52 in suitable fixed supporting means or bracket structure 150. Adjusting screw 151 is to be rotated by the flexible shaft housed in the flexible conduit 54, which again extends to a readily accessible point in the driver's compartment 25.

In the Fig. 5 embodiment, the sheave 70 is preferably associated with fixed guide means, such as a pair of sheaves or pulleys 72, 72, pivotally supported upon a fixed structure 73. In such case, the movable sheave 70 is preferably located between or substantially intermediate of the two fixed-pivot sheaves 72, 72 to be movable by the adjusting screw 151 along a path extending transverse of a line extending between the guide sheaves 72, 72, or a run 74 of the cable 68 extending therebetween.

In operation of the embodiment illustrated in Fig. 5, advance of the adjusting screw 151 moves the sheave 70 downwardly so as to increase the length of the cable run 74. As a result, the effective length of the linkage provided by cable 68 is shortened so as to swing the accelerator pedal arm 66 upwardly to cause the accelerator pedal 29 to be swung out away from the floor board 31. Conversely, with retraction of the adjusting screw 151 the cable run 74 is permitted to approach a straight line by raise of the sheave 70 to increase the effective length of the linkage cable 68, thereby permitting the accelerator pedal 29 to be swung toward the floor board 31. Of course, the accelerator pedal 29 will be suitably biased, such as by the force of gravity acting upon it and its arm 66; but if desired, such biasing may be supplemented by biasing spring means. Of course, pulley 70 may be omitted and pulleys 72, 72 mounted on a pivoted plate with the cable run 74 lapped over one and under the other; whereby when the plate and pulleys are pivoted the cable run is foreshortened.

In the embodiment proposed in Fig. 6, the accelerator pedal arm 66 is connected at 75 by flexible cable 168 to a quadrant 76 fixed upon a torque shaft 77 which operates the throttle valve. The cable 168 is lapped about movable sheave 70, rotatably supported by fork 171, which may be mounted on sliding bracket plate 145, movable by adjusting screw 51 relative to a fixed bracket 248, mounted upon bulkhead 28 and in the manner indicated above in connection with Figs. 1 and 2.

In operation of the embodiment shown in Fig. 6, sheave 70 may be raised by retracting the adjusting screw 51 from the remote control in the driver's compartment 25. As a result, the effective length of the linkage cable 168 is shortened to raise the arm 66 and swing the accelerator pedal 29 away from the floor board 31. Lowering of the sheave 70 will increase the effective length of the linkage cable 168 so as to permit the accelerator pedal 29 to be swung toward the floor board 31.

In the embodiment illustrated in Figs. 7 and 8, the linkage which connects the accelerator pedal 29 to the throttle valve arm 35 may include an adjustable section in the form of an adjustable bell crank 141, pivotally supported at 142 to fixed bracket 143 mounted on bulkhead 28. One arm 78 of adjustable bell crank 141 is connected by link 36 to the accelerator pedal 29. The other arm 79 is connected by link 44 to the throttle valve operating arm 35. One arm, such as 78, may have an offset portion to align the bottom ends of the bell crank arms, as shown. A wedging member 80 is interposed between the two bell crank arms 78 and 79 and pivotally carries, by means of pivot pin 81, a block 82 having an internally threaded hole 83 extending therethrough. One of the bell crank arms, for example, arm 78, carries a bracket 84 which rotatably and loosely supports adjusting screw 51. The adjusting screw 51 is threadably received in the internally threaded hole 83 extending through pivoted block 82.

Thus, when the adjusting screw 51 of the Figs. 7 and 8 embodiment is advanced in the block 82, the wedge 80 is drawn upwardly as viewed in Fig. 7 so as to increase the angle between the bell crank arms 78 and 79. As a result, the distance between the links 36 and 44 is increased to increase the effective length of the linkage so as to swing the accelerator pedal 29 outwardly away from the floor board 31. Conversely, with retraction of the adjusting screw 51 in the pivoted block 82, wedge 80 is lowered, as viewed in Fig. 7, so as to decrease the angle between the bell crank arms 78 and 79 to shorten the effective length of the linkage and permit the accelerator pedal 29 to swing toward the floor board 31. If desired, a helical tension spring 84 may be employed to tie together or bias the free ends of the bell crank arm 78 and 79. The adjustable bell crank 141 thus constitutes an adjustable section in the linkage which ties the accelerator pedal 29 to the throttle valve operating arm 35.

As shown in Fig. 9, the adjustable linkage section of the general type proposed in Figs. 7 and 8 may be modified as illustrated at 241. Arms 78 and 79 of the adjustable bell crank 241 may be caused to swing toward each other by retracting adjusting screw 51 in an internally threaded socket 85, or an internally threaded offset block similar to that shown at 82 in Fig. 8, pivotally supported at 86 upon the end of a lever 87, which is pivotally supported at 88 to the bell crank arm 79. The pivoted lever 87 carries a headed pin 89, which is slidably received in a slot 90 in the other bell crank arm 78. Thus, when the adjusting screw 51 is advanced in the socket 85, the lever 87 is swung upwardly in a clockwise direction as viewed in Fig. 9, so as to slide the pin 89 upwardly in slot 90 thereby increasing the angle between and the length of the linkage section comprising the adjustable bell crank arms 78 and 79. Rotation of screw 51 in the opposite direction decreases the angle between arms 78 and 79, and thus the length of the adjustable linkage section.

As proposed in Fig. 10, the adjustment of the effective length of linkage section of the type illustrated in Fig. 9 may be effected by pull cable or wire 57 rather than by means of a flexible shaft and adjusting screw. For this purpose, one end of the pull wire 57 is anchored at 186 to the lever 87 so that with pull on the wire this lever will be swung upwardly in a clock-wise direction as viewed in Fig. 10 to increase the angle between the adjustable bell crank arms 78 and 79, as in the Fig. 9 embodiment. Push on the wire or cable 57 will swing the lever 87 downwardly in a counter clock-wise direction as viewed in Fig. 10 to decrease the angle between the adjustable bell crank arms 78 and 79. In that manner, the effective length of the adjustable linkage section is altered at will and from a remote control point.

As shown in Figs. 11 and 12, the adjustable linkage section may be embodied in the form of an adjustable bell crank 341. The bell crank arm 178 may be provided with a worm gear-supporting bracket 91 comprising a pair of laterally spaced, substantially parallel journal arms 92, 92 which rotatably support therebetween a worm 93. The worm 93 is meshed with a worm gear segment 94, carried by bell crank arm 179. Bell crank arms 178 and 179 are pivotally connected together by pin 242 which mounts them to suitable fixed bracket means 143. Thus, the angle between the adjustable bell crank arms 178 and 179 may be altered at will by rotation of the worm 93 through the medium of the flexible shaft in the flexible conduit 54 which leads to the remote control point in the driver's compartment 25.

As illustrated in Fig. 13, the adjustable section in the linkage may be embodied in the form of a turnbuckle device including a sleeve 95, rotatably supported in a housing 96 and carrying fixed thereto, such as by press fitting, a gear 97 meshed with a worm 193, to be connected to the flexible shaft for rotation from the remote control point. The rotatable sleeve 95 is internally threaded and the threads in the right hand end thereof are opposite in hand to the threads in the left hand end thereof. Link 144 has external threads of a proper hand, threadably to be received in the right hand end of sleeve 95; and link 136 has external threads which are opposite in hand to those on link 144 so as to be threadably received in the left hand end of the sleeve 95. Thus, when the worm 193 is rotated from the remote control point, the gear 97 rotates the sleeve 95 in a direction either to thread the ends of the links 136 and 144 out of the sleeve 95 to increase the effective length of the linkage or to draw them into the sleeve to decrease the effective length of the linkage. It will thus be understood that the structure of Fig. 13 is in the nature of a turnbuckle, operated from a remote control point by a worm and gear mechanism.

As indicated in Fig. 14, the adjustable linkage section may comprise a socketed elongated member 98 internally threaded, threadably to receive adjusting screw 51. The adjusting screw 51 and its operating means may be housed in a sleeve 99 abutted against a collar 100 carried by flexible conduit 54, in which the screw-operating flexible shaft is housed. Socketed member 98 may carry an apertured ear 101, connectable to linkage means associated with the accelerator pedal, such as link 36 of the previous embodiments; and the sleeve 99 may carry another apertured ear 102 adapted to be connected to throttle valve linkage, such as link 44 of previous embodiments. The foreshortening and lengthening function resulting from screwing the adjusting screw 51 in or out is obvious in the light of the above-described operations of the preceding embodiments.

As indicated in Fig. 15, one end of the accelerator pedal connecting link 236 may be suitably anchored to the pull cable or wire 57 and with a sleeve 199, similar to the sleeve 99 of Fig. 14, housing the connection. The flexible conduit 54 which houses the pull wire 57 may, if desired, be anchored at 103, such as by solder in one end of the sleeve 199. As a result, pull and push on the cable 57 respectively will telescope the link 236 into and push it out of the sleeve 199. The linking means connected to the throttle valve may be fastened to the apertured ear 102 carried by sleeve 199, as in the Fig. 14 embodiment.

The adjustable section of the linkage connecting the accelerator pedal to the throttle valve may be in the form of a device adjustably operable by fluid pressure, as proposed in Fig. 16. As therein indicated, the apertured ear 101 may be carried by a collar 104 secured to a piston rod 105, reciprocatably mounted in a slave cylinder 106 and carrying a piston head 107 in camber bore 108 of the latter. The cylinder bore 108 communicates beyond the piston head 107 via a duct 109 and flexible conduit 110 with the interior of a pressure-developing operating or master cylinder 111. Piston 112 in master cylinder 111 may be connected to a screw 151, threadably received in one end of the cylinder 111 and operable by a flexible shaft in conduit 54. Compression spring 113 in master cylinder 111 biases the piston 112 outwardly; and compression spring 114 in slave cylinder 106 biases the piston 107 inwardly.

The Fig. 16 embodiment may be conditioned for operation as a hydraulically-operable device by charging the cylinders 106 and 111 and the connecting conduit 110 with liquid, such as oil or brake fluid, through a filler duct closable by a screw plug 115. As a result, when the screw 151 is rotated threadably to advance into the master cylinder 111 the piston 112 is pushed forward therein to reduce the internal capacity of that cylinder. Pressure is transmitted by the liquid to the slave cylinder chamber 108 to increase the capacity thereof by pushing the piston 107 outward. As a result, the distance between the linking ears 101 and 102, respectively carried by the piston rod 105 and the cylinder 106, is increased. With rotation of the screw 151 in the opposite direction, the piston 112 is permitted to be retracted in the master cylinder 111 by its biasing spring 113, thereby reducing the pressure in the slave cylinder chamber 108 to permit the biasing spring 114 to push the piston 107 forward, thereby shortening the distance between the linking ears 101 and 102.

As proposed in Fig. 17, a slave cylinder 206 may have its chamber 208 communicated via a duct 109 with a suitable liquid supply conduit, so that piston rod 205 carrying the piston head 107 may be moved to the right as viewed in Fig. 17 with increased pressure. The liquid under pressure may be supplied to duct 109 through flexible conduit 110 from a device similar to that proposed in Fig. 16, comprising master cylinder 111, piston 112, and adjusting screw 151. Such movement of the piston 107 toward the right in Fig. 17 shortens the distance between the linking ear 101, carried by the piston rod 205, and the linking ear 102, carried by cylinder 206, and against the biasing force of a compression spring 214. Upon reduction of the pressure in the slave cylinder chamber 208, the biasing spring 214 is permitted to push the piston 107 toward the left as viewed in Fig. 17, so as to increase the distance between the linking ears 101 and 102.

An electrically-controlled embodiment of the present invention is diagrammatically illustrated in Fig. 18 and, as therein indicated, may comprise an elongated member 198 carrying linking ear 101 and telescopically received in sleeve 199 carrying linking ear 102. The member 198 may be provided with a series of axially-spaced latching notches 116—116, selectively receivable of a latch pin 117, operable by or formed as the tip of a plunger core 118 of a solenoid 119. As diagrammatically illustrated therein, the solenoid 119 may be connected in series with the car battery 120 and a control switch or circuit-closing button 121, and the latter conveniently may be mounted upon the dash board, diagrammatically illustrated at 27.

In operation of the Fig. 18 embodiment, with the linking ear 101 connected to the accelerator pedal and the linking ear 102 connected to the throttle valve operating arm, the effective length of the linkage may be shortened manually at this adjustable section when unlatched. Unlatching is effected by energizing the solenoid 119 with hand closure of the circuit at the switch button 121 by the driver, who then applies foot pressure to the accelerator pedal for linkage adjustment. The energized solenoid withdraws latch pin 117 from one of the notches 116 in the member 198 to permit it to be telescoped into the sleeve 199 by such foot pressure in opposition to biasing force of compression spring 214 in the sleeve 199. It is to be understood that since the force which is to foreshorten the linkage is to be applied by foot pressure against the accelerator pedal in operation of the Fig. 18 embodiment, it is preferable that the biasing force of the spring 214 be less than the biasing force applied to the linkage at the throttle valve by the usual throttle valve spring, so that the foreshortening of the linkage by foot pressure will not tend to change the setting of the throttle valve. A spring 122 in the solenoid 119 causes the solenoid core 118 to return the latch pin 117 to latching position with engagement into another one of the notches 116 upon deenergization of the solenoid to lock the parts in the selected adjusted position. Such deenergization is effected when the switch button 121 is released to permit the solenoid circuit to be opened. Of course, similar latching means may be mechanically operated by a pull wire, such as that proposed in Fig. 3.

The length of the Fig. 18 linkage section may be lengthened by again energizing the solenoid 119 to withdraw the latch 117 from the notch 116 in which it is engaged and permitting the biasing spring 214 to push the member 198 a certain distance outwardly of the sleeve 199 with relief of foot pressure on the accelerator pedal. Thus, the driver may readily adjust the accelerator pedal to the angular position most comfortable to him by effecting unlatching of the Fig. 18 device when he presses the control button 121. He adjusts the position of the pedal either by swinging it toward the floor board with his foot or by letting it swing away from the floor board with gradual release of foot pressure thereon, as he may desire.

As illustrated in the Figs. 19 to 22 inclusive embodiment, the accelerator pedal connecting link 36 may be connected to one end of a lever 441 of the first class, pivotally mounted by pin 442 extending from one side of a movable or translatable block 123. The other end of the lever 441 may be connected by a link 440 to one end of another lever 437, which may be of the first class, and having its other end connected by link 44 to the throttle valve operating arm. The pivot of lever 437 at 438 may, as indicated in Fig. 20, comprise a headed pin 438 telescopically received by a bushing sleeve 500 extending through and fixed to the lever 437, and through mounting bracket 124. If desired, spacing washers 501, 501 may be interposed respectively between the head of the pin 438 and the mounting bracket 124, and the latter and the lever 437, with one end of the sleeve 500 received therethrough preferably to extend to the vicinity of the head of the pin 438. As illustrated in Fig. 20, the outer end of the sleeve 500 may extend appreciably beyond the outer face of the lever 437 to carry a set screw 502 for holding pin 438 therein and for a purpose to be explained later.

The mounting bracket 124, which is suitably supported in fixed position, such as by having a base flange 503 thereof bolted to the engine block diagramatically indicated at 504, is provided with suitably spaced ears or arms, such as integral flanges 505, 505, extending substantially normal to one side thereof, as is best seen in Fig. 21. The space between the opposed faces of the flanges 505, 505 is appreciably greater than the width of the translatable block 123 to permit appreciable traverse motion of the block therebetween. Economical manufacture of the embodiment proposed in Figs. 19 to 22 incl. may dictate that the flanges 505, 505 be dinked out of the plate stock of the bracket 124 itself, and then bent at right angles relative thereto as shown. Such production procedure leaves a substantially rectangular hole 506 in the bracket plate 124, which may be bridged by opposed wings 507, 507 provided on and made integral with the top and bottom sides of the block 123, and with the outside faces of these wings substantially aligned with the back face of the block. The wings 507, 507 thus serve to slide along the face of those portions of the flange 124 remaining above and below the hole 506 to prevent rotation of the block 123. If desired, the top wing 507 may carry pivot pin 442, as will be seen from Figs. 21 and 22.

The translatable block 123 preferably is provided with a through bore 508, which is internally threaded, threadably to receive an adjusting screw 251 so that as the latter is rotated, the block 123 will be caused to travel axially therealong. The adjusting screw 251 may be rotatably supported through the flanges 505, 505 by any suitable bearing means. However, since the loads on the parts of such a mechanism are small and there usually is a minimum of relative motion in the adjusting elements thereof during prolonged life of the device, the screw 251 may be rotatably supported by flanges 505, 505 in a simple manner, such as by extending the screw through enlarged holes 509 in the flanges. The screw may carry against the outer faces of the flanges 505, 505, collars 510, 510 suitably fixed thereto, such as by set screws, so as to limit axial motion of the adjusting screw relative to the supporting flanges. As in other embodiments, the adjusting screw 251 is suitably connected to a rotating flexible shaft, suitably housed in flexible conduit 54 which extends to the remote control point in the driver's compartment. The adjusting screw 251 may, if desired, also carry a manual hand knob 511, as is best seen in Fig. 21, so that, if desired, the device may be readily adjusted at the location of its mounting when the device is installed.

In operation of the embodiment illustrated in Figs. 19 to 22 incl., the relative position of the accelerator pedal, which may be connected to one of the levers 437 and 441, such as by link 36, is readily effected by adjusting the other of those two levers relative to the former so that the space between the link 36 and the link 44, which is connected to the throttle valve operating arm, dictates the proper effective length of the linkage for disposing the accelerator pedal at the most comfortable position for a particular driver. Whenever the position of the accelerator pedal is to be changed to satisfy the demands of another driver, such adjustment is readily effected by rotating by hand the adjusting screw 251 from the remote control point by the flexible drive shaft so as to cause the block 123 to traverse in one or the other direction a path between the two spaced supporting flanges 505, 505. The block 123 in its motion carries the pivot pin 442 so as to alter the position of the lever 441, thereby changing the space between the connected ends of the links 36 and 44.

As indicated in Fig. 23, a device similar to that proposed in Figs. 19 to 21 incl. may be associated with torque rod means to adjust in a similar manner the effective length of the linkage between the accelerator pedal and the throttle valve. For example, as shown in Fig. 23, a mechanism similar to that proposed in Fig. 19 may be provided with, however, a substantial reversal of the parts so that the lever 437, which is connected to the throttle valve-operating link 44, may be mounted upon the movable pivot 442 rather than on the fixed pivot 438. In such event, the sleeve 500 carries fixed thereto a lever arm 541 connected by link 440 to the other end of lever 437. A cross-shaft 512 may have one end thereof extended through sleeve 500 in lieu of pin 438 and with set screw 502 fixedly securing the shaft to the sleeve and thus to the lever arm 541. The other end of torque shaft 512 is suitably supported by other bracket means, such as that diagramatically illustrated at 513, and carries another lever or crank arm 514, to which the link 36 is connected. It will be understood from the operation of the Figs. 19 to 22 incl. embodiment described above that with adjustment of the position of the block 123, the pivot 442 of lever 437 may be moved to change the effective length of the linkage, particularly since such movement of that pivot point changes the angularity between the lower end of lever 437 and lever arm 541 and, for similar reason, the angularity between the lower end of lever 437 and the crank arm 514.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Having described my invention, what I claim as new and desire to secure by Letters Patent is:

1. Accelerator foot control or pedal position adjusting mechanism for internal combustion engines of conventional automobiles characterized by separated engine and driver's compartments and comprising, in combination; a settable throttle valve means in the engine compartment having an initial engine-idling position and movable to greater open positions to increase rate of fuel supply to the engine; abutment means in the path of and defining the initial engine-idling position of said throttle valve means when the latter is abutted thereagainst; a movable accelerator foot control in the driver's compartment having an initial still position corresponding to the initial engine-idling position of said throttle valve means, said foot control being depressible by the driver's foot; an adjustable control linkage of predetermined effective length maintainable at will to a constant lineal value and connecting said foot control to said throttle valve means to move without lost motion the latter in direct response to the former away from said abutment means to the greater open positions of said throttle valve means when said foot control is depressed by the driver's foot from its initial still position; operable length-adjusting means in said linkage between said throttle valve means and said foot control settable by the driver at will to adjusted positions of change of the effective length of said linkage whereby the initial still position of said foot control may be changed while said throttle valve means is held in its initial engine-idling position against said abutment means; biasing means connected to said throttle valve means between said operable length-adjusting means and said throttle valve means constantly urging the latter toward its initial engine-idling position and simultaneously through said linkage urging said foot control toward its initial still position with a single resultant force less than that applicable to the latter by the driver's foot; a manually-operable hand control means mounted in said driver's compartment in a position readily accessible to a hand of the driver; and linkage-adjustment operating means connecting said hand control means to said length-adjusting means for manipulating the latter upon manual operation of said hand control means to alter only the initial still position of said foot control with maintenance of the initial engine-idling positon of said throttle valve means against said abutment means by said biasing means, said control linkage and its included operable length-adjusting means structurally maintaining the adjusted effective length of said linkage between said throttle valve means and said foot control through periods of operation of said throttle valve means by foot manipulation of said foot control during maintenance of the setting of said length-adjusting means.

2. The accelerator adjustment mechanism as defined in claim 1 characterized by said linkage adjustment means comprising connecting lever means in said control linkage alterable of the effective length of the latter with change in position of said lever means, movable means pivotally supporting said lever means, and means to change the position of said lever-supporting means comprising said linkage-adjustment operating means connected to said hand control means.

3. The accelerator adjustment mechanism as defined in claim 2 characterized by said movable supporting means as comprising a movable support member and said lever means as comprising a lever of the first class having a pivot mounted on said support member.

4. The accelerator adjustment mechanism as defined in claim 3 characterized by said support member being a bracket slidably mounted on a fixed base plate member, said bracket and base plate members having opposed spaced portions to be moved toward and away from each other to alter the position of the lever pivot, said means connected to said hand control means being adapted to move said bracket portion relative to said base plate portion.

5. The accelerator adjustment mechanism as defined in claim 2 characterized by said linkage-adjustment operating means connected to said hand control means as comprising a rotatable screw threadably to move said lever-supporting means.

6. The accelerator adjustment mechanism as defined in claim 4 characterized by said means to move said bracket portion relative to said base plate portion being a screw rotatably supported by a projection on one of said bracket and base plate members and threadably engaged in a threaded hole in an opposed projection on the other of said members, said screw being rotatably connected by a flexible drive to a rotatable knob serving as said hand control means.

7. The accelerator adjustment mechanism as defined in claim 2 characterized by said lever supporting means as comprising a movable block having a pivot swingably-supporting said lever means, said block being movable by said hand control means.

8. The accelerator adjustment mechanism as defined in claim 7 characterized by said block having means to cooperate with a remote control-driven screw to change the position thereof.

9. The accelerator adjustment mechanism as defined in claim 8 characterized by said block having an internally-threaded hole extending therethrough threadably receiving said screw with the latter supporting said block and being driven from said remote hand control means by a flexible drive.

10. The accelerator adjustment mechanism as defined in claim 9 characterized by a fixed bracket having a pair of spaced, outwardly projecting flanges having aligned holes therein receiving said screw with said block supported by the latter between said flanges, said bracket having guide means to prevent rotation of said block during traverse motion of the latter.

11. The accelerator adjustment mechanism as defined in claim 10 characterized by said fixed bracket pivotally supporting a second lever at a fixed pivot point, said movable-pivot and fixed-pivot levers being linked together with one connected to said accelerator foot control and the other connected to said throttle valve means.

12. The accelerator adjustment mechanism as defined in claim 1 characterized by a flexible pull member incorporated in said linkage, sheave guide means for said flexible pull member, and means including said remote hand control means to adjust said sheave guide means to vary the path of said flexible pull member for changing the effective length of said linkage.

13. The accelerator adjustment mechanism as defined in claim 12 characterized by said sheave guide means as comprising a movable sheave and said flexible pull member as comprising a cable lapped thereagainst, said sheave being pivotally mounted on movable mounting means adjustably positioned by said remote hand control means.

14. The accelerator adjustment mechanism as defined in claim 13 characterized by said sheave guide means as including a pair of spaced guides at fixed locations against which said cable is lapped with said sheave being located therebetween and movable in a path transverse to a line extending from one to the other of said guides, whereby the length of cable to extend from one to the other of said guides and against said sheave may be varied by change in position of said sheave.

15. The accelerator adjustment mechanism as defined in claim 1 characterized by said linkage adjustable means as comprising a pair of members pivotally connected together with one linked to said foot control and the other to said throttle valve means at certain linking points remote from the pivotal connection thereof, and means for adjusting the angular relation of said members to change the distance between said linking points.

16. Accelerator foot control or pedal position adjusting mechanism for internal combustion engines of conventional automobiles characterized by separated engine and driver's compartments and comprising, in combination; a settable throttle valve in the engine compartment having an initial engine-idling position and movable to greater open positions to increase rate of fuel supply to the engine; abutment means in the path of and defining the initial position of said throttle valve when the latter is abutted thereagainst; a movable accelerator foot control mounted in the driver's compartment having an adjustable still position corresponding to the initial engine-idling position of said throttle valve, said foot control being depressible by the driver's foot; an adjustable control linkage of predetermined effective length maintainable at will to a selected constant lineal value and connecting said foot control to said throttle valve to move without lost motion the latter in direct response to the former away from said abutment means to the greater open positions of said throttle valve when said foot control is depressed by the driver's foot from its initial still position; operable length-adjusting means in said linkage between said throtle valve and said foot control settable by the driver at will to adjusted positions of change of the effective length of said linkage for attaining adjustment of the still position of said foot control at any particular setting of the initial engine-idling position of said throttle valve against said abutment means without effecting change in engine-idling position of said throttle valve, said length-adjusting means comprising a linkage section having opposed elongated members movably connected together for longitudinal length-adjusting motion to temporarily set positions relative to each other and longitudinally-spaced means connecting said linkage section into said linkage with said longitudinally-spaced connecting means being caused to approach each other when said linkage section members are moved longitudinally toward each other to effect foreshortening of said linkage section and consequentially foreshorten the effective operative length of said linkage and with said longitudinally-spaced connecting means being caused to recede from each other when said linkage section members are moved longitudinally away from each other to effect lengthening of said linkage section and consequentially lengthen the effective operative length of said linkage; spring means connected to said throttle valve between said linkage section and said throttle valve constantly urging the latter toward said abutment means with a certain force in a direction simultaneously to move said throttle valve to its engine-idling position dictated by said abutment means and said foot control to its initial still position when the driver's foot applies less force to said linkage in the opposite direction by pressure on said foot control; a remote, hand operable control mounted in the driver's compartment in a readily accessible position with respect to the driver's hands; and operating means connecting said hand operable control to said linkage section selectively to move said linkage section members toward and away from each other to relatively set positions to effect adjustment of the effective length of said linkage section and attendant adjustment of the effective length of said control linkage upon manipulation of said hand operable control by the driver, said control linkage and its length-adjusting section structurally maintaining the adjusted effective length of the former between said throttle valve and foot control through periods of operation of said throttle valve by manipulation of said foot control during maintenance of the setting of said linkage section.

17. The accelerator adjustment mechanism as defined in claim 16 characterized by said linkage section members being telescopically mounted together for axial adjustment relative to each other, said telescoped members being movably connected together by mechanism for telescopically moving one in the other, said hand operable control being mechanically connected to said mechanism for operating the latter.

18. The accelerator adjustment mechanism as defined in claim 17 characterized by said mechanism including a pair of interengaging screw means with said hand control being adapted to rotate one with respect to the other to effect the relative adjustment.

19. The accelerator adjustment mechanism as defined in claim 18 characterized by one of said screw means being an internally-threaded female member and the other being an externally-threaded male member mated therein with one being rotatable by said hand control relative to the other to effect the relative telescopic movement thereof.

References Cited in the file of this patent

UNITED STATES PATENTS

| | | |
|---|---|---|
| 1,443,510 | Thomas | Jan. 30, 1923 |
| 1,496,357 | Page | June 3, 1924 |
| 1,646,937 | Spiro | Oct. 25, 1927 |
| 1,994,651 | Kingston | Mar. 19, 1935 |
| 2,118,730 | Kalbrier | May 24, 1938 |
| 2,236,145 | Kolb | Mar. 25, 1941 |
| 2,313,000 | Hauguel | Mar. 2, 1943 |
| 2,506,940 | Ryder | May 9, 1950 |
| 2,548,994 | Miller et al. | Apr. 17, 1951 |
| 2,613,548 | Davis | Oct. 14, 1952 |

FOREIGN PATENTS

| | | |
|---|---|---|
| 7,224 of 1905 | Great Britain | Apr. 5, 1905 |
| 9,866 of 1904 | Great Britain | June 2, 1904 |
| 685,427 | Great Britain | Jan. 7, 1953 |